United States Patent [19]

Insolio

[11] Patent Number: 4,691,438
[45] Date of Patent: * Sep. 8, 1987

[54] CONSTANT FORCE MANUAL GLASS CUTTER

[76] Inventor: Thomas A. Insolio, 22 Elaine Dr., Bristol, Conn. 06010

[*] Notice: The portion of the term of this patent subsequent to Feb. 8, 2004 has been disclaimed.

[21] Appl. No.: 700,410

[22] Filed: Feb. 11, 1985

[51] Int. Cl.⁴ .............................................. B26B 3/00
[52] U.S. Cl. ................................... 30/164.95; 10/293
[58] Field of Search ................. 30/164.9, 164.95, 293; 83/879, 886, 881, 872

[56] References Cited

U.S. PATENT DOCUMENTS 2,341,030  2/1944  Fletcher ........................... 30/164.95
2,685,764  8/1954  Hatfield ............................ 30/164.95

*Primary Examiner*—Douglas D. Watts
*Attorney, Agent, or Firm*—McCormick, Paulding & Huber

[57] ABSTRACT

The cutter is a tool used to manually score a flat sheet of glass which lies on a thin resilient cover on a table. With this tool, the force applied by the cutting (scoring) wheel cannot exceed a preset limit even though a greater force is applied on the handle. Thus a deleterious excessive scoring force cannot be applied. The cutting wheel is mounted in a pillar post (wheel holder). The pillar post slides in a slot cut in the lower portion of the handle. The post is mounted to the free end of the prestressed spring wire. When not scoring, the spring urges the post (and wheel) downward. This movement is limited by a spring stop so that the cutting wheel projects ⅛ inch or less below the slot legs. When the cutter is applied to score the glass a manual force is applied to the handle. The wheel and pillar are forcibly retracted into the slot in the handle, until the bottoms of the wheel and slot legs all bear on the glass. The applied force is AF and the scoring force is CF. CF is less than AF. CF is fixed and limited by the spring. A residual force RF, is applied by the slot legs on the glass.

13 Claims, 8 Drawing Figures

.5CF = HALF OF CUTTING FORCE
T = TENSION
C = COMPRESSION

CONSTANT FORCE MANUAL GLASS CUTTER

SUMMARY OF INVENTION

This invention relates to a manual tool with a scoring wheel (called a glass cutting wheel) for scoring flat sheets of glass or the like, while the sheet lies on a thin resilient cover on a table. The tool is designed to limit the force applied by the cutting wheel on the glass to a constant predetermined level. The scoring force CF is limited and constant while a greater force AF is manually applied on the handle. The cutting wheel is mounted in its holder, the pillar post, which is mounted on a prestressed spring and slides in a slot cut in the lower portion of the handle. When the force AF is applied on the handle, the cutting wheel applies force CF on the glass. The residual force RF is applied by the slot legs on the glass. RF=AF−CF.

The principal object of this invention is to prevent the application of excessive force by the cutting wheel. When scoring glass with a manual cutter the force applied is a matter of feel or adjustment and is not easily controlled. Excessive force will cause the wheel to spall the line of score, and the resultant edge after break out will be chipped and defective. If sufficient force is not applied an adequate fissure will not be scored, and break-out will be difficult and defective. A specific glass is best scored with a cutting wheel having the correct angle sharpened on its periphery and with the correct scoring A secondary feature of this invention aids in the development of a proper score with the cutter. The cutting wheel and its holder (the pillar post) slide in the handle between the two legs of a slot cut in the handle. A spring in the handle urges the pillar post, and hence the cutting wheel, onto the glass with a force CF. The bottoms of the slot legs are on either side of the wheel. Each of the two legs apply a force of 0.5 RF on the glass. The force applied on the handle is AF, and AF=CF+RF. Because the glass lies on a thin resilient material covering the table, it can be shown that the forces 0.5 RF pressing down on either side of the cutting wheel will develop a tensile stress in the glass transverse to the line of score. It can also be shown that a glass cutting wheel develops a tensile stress in the glass transverse to the line of score to create a fissure into the surface. The stress developed by forces 0.5 RF therefore aid the cutting wheel by developing a tensile stress which adds to the tensile stress generated by the wheel.

In summary, this invention is a manual tool adapted for scoring sheet material such as glass which lies on a thin resilient material covering a table. The tool has a handle with a slot in its lower portion to receive a pillar post which holds a glass cutting wheel. The pillar post is slidably contained in the slot and is mounted to the free end of a spring wire. The spring is contained in the slot in the handle. One end of the spring is the free end to which the pillar post is mounted. The opposite end is mounted to a support pivotally mounted to the handle. A stop mounted in the handle supports the spring wire at its free end near the pillar post and prevents the spring wire from swinging downward out of the slot. A force screw threaded into the top of the handle extends down onto the spring support and forces the spring to bend between the stop and the support, thus prestressing the spring.

The cutting wheel normally projects slightly (about ⅛") below the bottoms of the two legs of the slot cut in the handle. When the tool is used to score the glass, the applied force causes the cutting wheel (and pillar post) to retract into the slot, thus increasing the stress in the spring wire. While scoring, the cutting wheel and the bottoms of the two slot legs bear on the glass. The cutting wheel applies a preset force CF on the glass, and the slot legs each apply a force of 0.5 RF.

BRIEF DESCRIPTION OF THE DRAWINS

Figure 8:
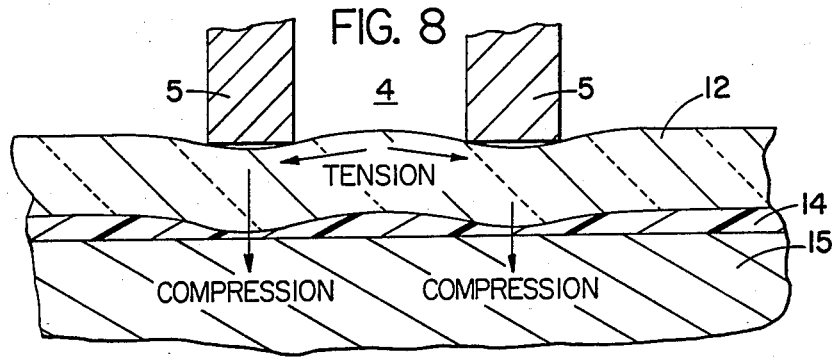

FIG. 8 is an enlarged view of the slot legs bearing on the glass. The cutting wheen is not shown. This is a view having no dimensional scale whatsoever, and is used to illustrate the concept of the forces developed in the glass when stressed in compression by the slot legs when the score is being made.

DETAILED DESCRIPTION OF THE DRAWINGS

Figure 2:
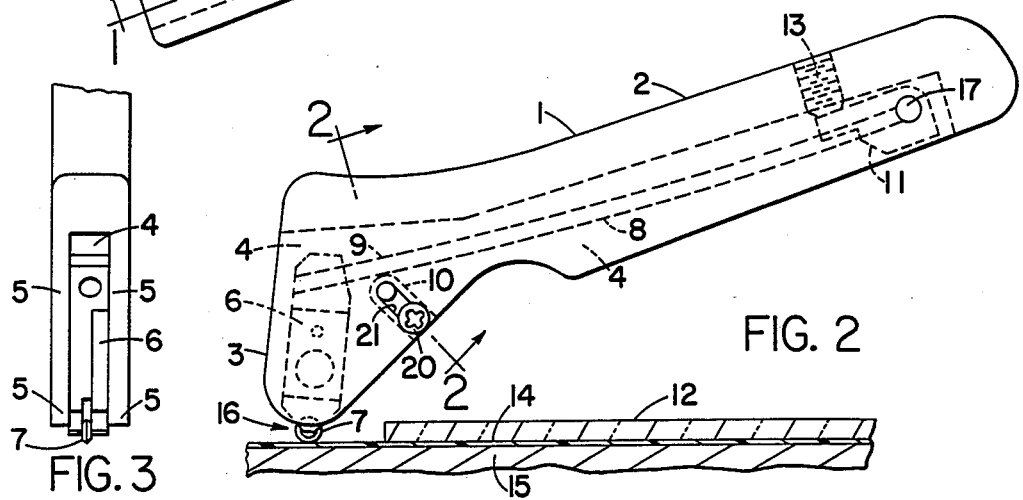
FIG. 2 is a side elevation of the cutter, oriented approximately in the position it would be held relative to the glass. Internal components, being hidden, are outlined by dotted lines according to convention.

FIG. 2 shows the cutter 1 when it is not being applied to score the glass 12. The spring 8 is mounted to the spring support 11. The pillar post 6 is mounted to the opposite or free end 9 of the spring. Spring force screw 13 is threaded into the handle 2 and emerges into the slot 4 to contact the spring support 11. Force screw 13 forces support 11 to pivot on pivot pin 17. This action bends the spring 8 because spring stop 10 prevents the spring from moving about pin 17. Pillar post 6 is mounted on the free end 9 of spring 8. Stop 10 limits the downward travel of this free end, and of the pillar post. Cutting wheel 7 is mounted in pillar post 6. The travel limiting function of stop 10 thus limits the downward travel of the cutting wheel 7 so that its projection 16 below the bottom of the cutter is about ⅛ inch.

Figure 6:
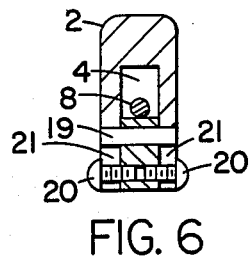
FIG. 6 is a sectional view taken generally along line 2—2 of FIG. 2.

Cutting wheels wear and must be replaced with new ones occasionally. Spring stop 10 is held in place by screws 20. When the stop is removed the spring 8 can be pivoted about pin 17 to allow emergence of pillar post 6, FIG. 2. The cutting wheel 7 can then be changed. The pillar post is then swung back into position in the containing slot 4 in the handle 2, FIG. 2. The stop 10 is replaced by inserting pin 19 in slot 21, FIGS. 2 and 6. When pin 19 is at the upper limit of slot 21, screws 20 are threaded into both sides to hold th stop to the handle. If installed as described, the stop will return spring 8 to its former position and prestressed as before, FIG. 2.

Figure 1:
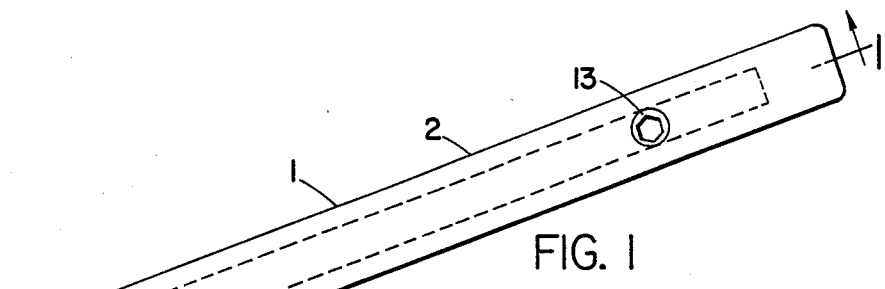
FIG. 1 is a plan view of the cutter, as projected from FIG. 2.
Figure 3:
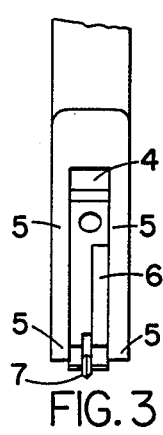
FIG. 3 is the end view of the left end of the cutter as shown in FIG. 2. It shows the cutting wheel projecting below the cutter as it would when not scoring the glass.
Figure 4:
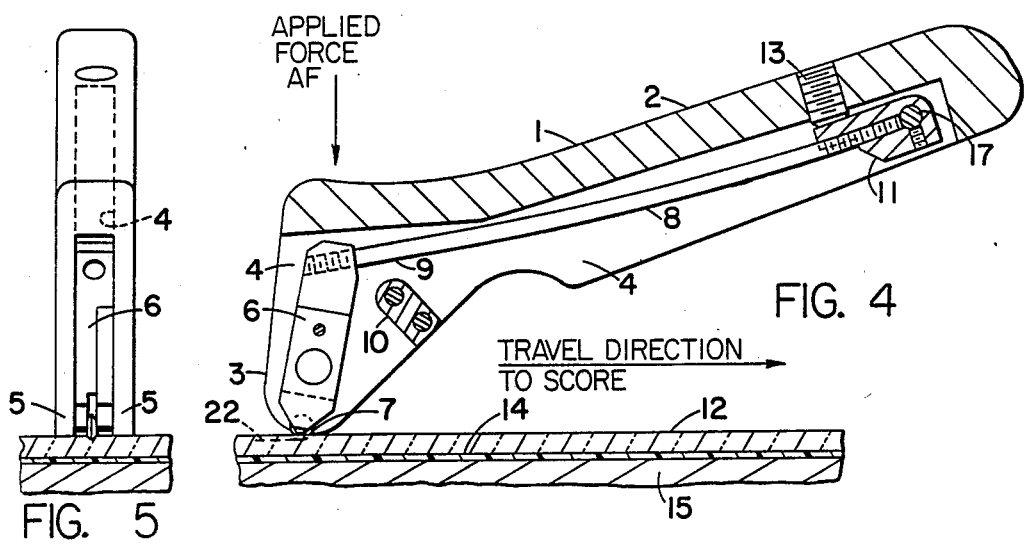
FIG. 4 is the sectional vertical view taken on line 1—1 of FIG. 1. It shows the internal components.

The cutter 1 is adapted to score a sheet of glass 12, FIGS. 2 and 4, which lies on a thin sheet of resilient material 14 covering a table 15. To score the glass, the cutter 1 is drawn over the glass surface in a direction from left to right as shown on FIG. 4. A downward force, AF, is manually applied on the handle. Force AF causes the pillar post 6 (and the cutting wheel 7) to retract into the containing slot 4, FIGS. 3 and 5. The pillar post raises the free end 9 of spring 8 from stop 10, FIG. 4. This action increases the stress in the spring and it urges the cutting wheel to exert a force CF on the glass 12, FIG. 4. In scoring the glass, cutting wheel 7 develops a fissure 22 into the surface, FIG. 4. The fissure is a minute fracture about 0.01 inch deep.

Figure 5:
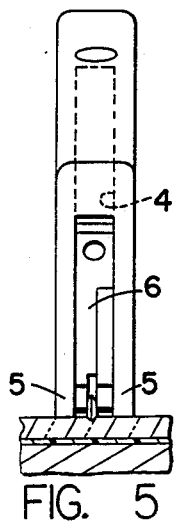
FIG. 5 is similar to FIG. 2, but shows the cutting wheel retracted as it would be when scoring the glass.

While scoring the glass 12, the cutting wheel 7 (and pillar post 6) are forced to retract into the containing slot 4, FIGS. 4 and 5). The bottom of the cutting wheel 7 and the bottoms of both legs 5 of slot 4 all bear simultaneously on the surface of the glass sheet 12, FIG. 5. The scoring force CF is therefore constant. The cutting wheel 7, through pillar post 6, will not retract further and change the stress in spring 8. The applied force AF must always be greater than the scoring force CF. The residual force RF is applied by the bottom of the legs 5 of slot 4, FIGS. 4 and 5, on the glass surface 12.

Figure 7:
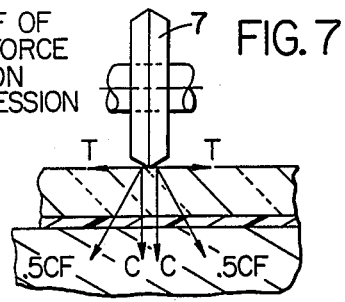
FIG. 7 is an enlarged view of the cutting wheel and shows the resolution of the scoring force CF.

There are two legs 5 of slot 4, FIG. 5. Each bears on the glass we with a force of 0.5 RF, FIG. 8. These forces compress the glass under the legs and the resilient material 14 under the glass 12, FIG. 8 shows the glass sheet as being physically bent by forces 0.5 RF. This of course is in theory and cannot be detected. FIG. 8 shows a theoretical bending to indicate that the compressive forces may be bending the glass. The tendency to bend the glass under the slot legs develops a stretch or tensile stress in the glass between the legs. This tensile stress is transverse to the line of score. FIG. 7 shows the resolution of the force CF applied by the cutting wheel 7 on the glass 12. The horizontal components are tensile forces which develop the fissure 22, FIG. 4, a minute linear fracture. The tensile force developed by slot legs 5, FIG. 8, aid the cutting wheel to develop a clean slot and minimize the spalling of the glass which normally occurs when glass is scored.

The shape of the handle 2, FIG. 2 can of course be changed to assume some other shape for applying force AF; or it may be a component of a cutting head of a cutting machine. The intent of this invention is that the bottoms of the two legs of a slot in the handle straddle the cutting wheel, and the legs and wheel bear on the glass while it is being scored. The description specifies that a prestressed spring wire urges the pillar post and cutting wheel downward. This function can be performed by some other type of spring. These changes do not affect the intent of this invention. The handle 2 is preferably made from a moldable thermoplastic or thermosetting material, and is much softer than the glass being scored. However, the handle 2 can also be made of a metal material, such as aluminum if the lower ends of the legs, or furcations 5, 5 are coated with a layer of suitable antifriction material such as polytetrafluorethelene (PTFE) or the equivalent.

I claim:

1. A glass cutter to manually score sheet material such as glass which lies on a table, and comprising a handle or body with its lower portion slotted lengthwise to contain an assembly comprising a spring wire, a spring support, spring wire threaded at one end to spring support which is pivotally mounted on a pin fitted through the handle, an opposite end of the spring wire is the free end and is threaded to a cutting wheel holder and acts on the holder to urge its downwardly, a force screw threaded into and through the top of the handle to bear on the spring support to force it to pivot about its supporting pin and to force the free end of the spring downward, a stop for said spring wire and cooperating with said force screw to prestress the spring such that the holder is forced downward to a limit position such that the cutting wheel (in the post) projects below the handle.

2. A cutter as set forth in claim 1 having a preset force urging the cutting wheel to project below the cutter handle about ⅛ inch. When the cutter is brought to bear on the glass by applying a force AF on the handle such that the cutting wheel retracts into the slot in the handle, this retraction stops when the cutting wheel and the bottoms of the slot all bear on the glass. The spring now urges the cutting wheel on the glass with a limited force CF. The applied force AF is greater than CF and will vary because it is manually applied. CF is less than AF and remains constant.

3. A cutter as set forth in claims 1 and 2 which when a force AF is applied on the handle to score glass causes a lesser but preset constant force CF to be applied by the cutting wheel on the glass. The residual force RF is applied by the bottoms of the slot legs which straddle the cutting wheel. $RF = AF - CF$. Each slot leg bears on the glass with a force of 0.5 RF. These are compressive forces which stress the surface of the glass in tension between the legs and transverse to the line of score. This tensile stress in the glass aids the cutting wheel and helps produce the proper fissure when it scores the glass.

4. A hand held glass cutter for scoring flat glass and comprising, an elongated handle having one end provided with spaced furcations to define a downwardly open slot, a tool holder received in said slot and movable between first and second positions therein, an elongated leaf spring provided for movement in a recess defined by said handle, said spring having one end in engagement with said tool holder and an opposite end mounted to said handle, said tool holder being biased toward said first position by said leaf spring, said tool holder having a glass scoring tool in one end such that said tool projects beyond the ends of said handle furcations by approximately ⅛ inch when said tool holder is in said first position, adjustable stop means defined in said handle and engageable with said spring to define said first position, said second tool holder position achieved by deflection of said leaf spring and corresponding movement of said tool holder inwardly of said slot such that said handle furcation ends of said handle contact the surface of the glass being scored to limit the manual scoring force on the glass in spite of excessive force exerted by the user's hand on the handle as a result of such contact between said handle furcation ends and the glass.

5. The cutter of claim 4 wherein said handle furcation ends have a consistency such that they do not scratch or mar the glass being scored.

6. The cutter of claim 4 wherein said handle furcation ends are coated with PTFE or its equivalent.

7. The cutter of claim 4 wherein said handle furcations are fabricated from a plastic material which in its hardened state is softer than the glass to be scored.

8. A hand held glass cutter for scoring flat glass and comprising, an elongated handle having one end provided with spaced furcations to define a downwardly open slot, a tool holder received in said slot and movable between first and second positions therein, an elongated leaf spring provided for movement in a recess defined by said handle, said spring having one end in engagement with said tool holder and an opposite end mounted to said handle, said tool holder being biased toward said first position by said leaf spring, said tool holder having a glass scoring tool in one end such that said tool projects beyond the ends of said handle furcations when said tool holder is in said first position, stop means defined in said handle and engageable with said spring to define said first position, said second tool holder position achieved by deflection of said leaf spring and corresponding movement of said tool holder inwardly of said slot such that said handle furcation ends of said handle contact the surface of the glass being scored to limit the manual scoring force on the glass in spite of excessive force exerted by the user's hand on the handle as a result of such contact between said handle furcation ends and the glass, by means for mounting said opposite leaf spring end to said handle, said means comprising a spring support pivotably mounted in said handle and secured to said spring opposite end, and biasing force adjustment means acting on said pivotably mounted spring support to preload said spring's biasing force on said tool holder in said first position.

9. The cutter of claim 8 wherein said stop means is adjustable.

10. The cutter of claim 8 wherein said tool projects beyond the ends of said handle furcations in said first position by approximately $\frac{1}{8}$ inch.

11. The cutter of claim 8 wherein said handle furcation ends have a consistency such that they do not scratch or mar the glass being scored.

12. The cutter of claim 8 wherein said handle furcation ends are coated with PTFE or its equivalent.

13. The cutter of claim 8 wherein said handle furcations are fabricated from a plastic material which in its hardened state is softer than the glass to be scored.

* * * * *